US010248425B2

(12) United States Patent
Fei

(10) Patent No.: US 10,248,425 B2
(45) Date of Patent: Apr. 2, 2019

(54) PROCESSOR WITH SLAVE FREE LIST THAT HANDLES OVERFLOW OF RECYCLED PHYSICAL REGISTERS AND METHOD OF RECYCLING PHYSICAL REGISTERS IN A PROCESSOR USING A SLAVE FREE LIST

(71) Applicant: VIA ALLIANCE SEMICONDUCTOR CO., LTD., Shanghai (CN)

(72) Inventor: Xiaolong Fei, Beijing (CN)

(73) Assignee: VIA ALLIANCE SEMICONDUCTOR CO., LTD., Shanghai (CN)

(*) Notice: Subject to any disclaimer, the term of this patent is extended or adjusted under 35 U.S.C. 154(b) by 244 days.

(21) Appl. No.: 15/235,662

(22) Filed: Aug. 12, 2016

(65) Prior Publication Data
US 2017/0371673 A1 Dec. 28, 2017

(30) Foreign Application Priority Data
Jun. 28, 2016 (CN) .......................... 2016 1 0496523

(51) Int. Cl.
G06F 9/30 (2018.01)
G06F 9/38 (2018.01)
(52) U.S. Cl.
CPC .......... *G06F 9/3855* (2013.01); *G06F 9/3005* (2013.01); *G06F 9/30098* (2013.01); *G06F 9/384* (2013.01)
(58) Field of Classification Search
CPC ................................................... G06F 9/3855
See application file for complete search history.

(56) References Cited

U.S. PATENT DOCUMENTS

| 6,959,377 | B2 | 10/2005 | Gold et al. | |
|---|---|---|---|---|
| 7,096,345 | B1* | 8/2006 | Chen | G06F 9/3838 712/217 |
| 2005/0216703 | A1* | 9/2005 | Dieffenderfer | G06F 9/3842 712/207 |
| 2011/0161616 | A1* | 6/2011 | Tarjan | G06F 9/384 711/170 |
| 2014/0089638 | A1* | 3/2014 | Mylius | G06F 9/3017 712/208 |
| 2014/0201435 | A1* | 7/2014 | Dong | G06F 13/1694 711/105 |

* cited by examiner

Primary Examiner — Aimee Li
Assistant Examiner — William V Nguyen
(74) Attorney, Agent, or Firm — McClure, Qualey & Rodack, LLP

(57) ABSTRACT

A processor including physical registers, a reorder buffer, a master free list, a slave free list, a master recycle circuit, and a slave recycle circuit. The reorder buffer includes instruction entries in which each entry stores physical register indexes for recycling physical registers. The reorder buffer retires up to N instructions in each processor cycle. Each master and slave free list includes N input ports and stores physical register indexes, in which the master free list stores indexes of physical registers to be allocated to instructions being issued. When an instruction is retired, the master recycle circuit routes a first physical register index stored in an instruction entry of the instruction to an input port of the master free list, and the slave recycle circuit routes a second physical register index stored in the instruction entry of the instruction to an input port of the slave free list.

16 Claims, 4 Drawing Sheets

PROCESSOR WITH SLAVE FREE LIST THAT HANDLES OVERFLOW OF RECYCLED PHYSICAL REGISTERS AND METHOD OF RECYCLING PHYSICAL REGISTERS IN A PROCESSOR USING A SLAVE FREE LIST

BACKGROUND OF THE INVENTION

Field of the Invention

The present invention relates in general to the process of recycling registers in a processor, and more particularly to a processor and method of providing a slave overflow free list that enables recycling registers more efficiently to meet timing criterion.

Description of the Related Art

A processor incorporates a set of registers to store the results of write operations. Write operations are performed by a subset of the standard instruction set architecture (ISA) of the processor, such as the x86 architecture or the like by Intel®. In many architectures, including x86, instructions that perform a write operation may refer to at least one of a set of predefined architectural registers for storing the results. More recent processor configurations implement a physical register file (PRF) renaming style that makes the processor design more concise and enables more convenient design expansion. A processor with PRF renaming incorporates a physical register file (PRF) for storing operation results and a renaming structure for mapping architectural registers to physical registers. The PRF is a set of physical registers, each being identified using a unique one of a set of indexes or the like. The term "index" as used herein refers to any type of index, address value or identifier or the like that identifies or that otherwise may be used to access a corresponding physical register. The renaming structure maps an architectural register referenced by an instruction to an index of a corresponding physical register.

During execution of a software program or application, when an instruction is encountered that references an architectural register for storing the results of the instruction, the processor allocates an available physical register from among a "free list" of physical register indexes, attaches or otherwise assigns the selected physical register index to the instruction, and updates a renaming structure to speculatively map the architectural register to the selected physical register. When the instruction is executed, the index is used to access the physical register to store the results. When the instruction is retired, the index may be moved to a retire portion of the renaming structure (or else to a different renaming structure) to map the physical register to the specified architectural register. The physical to architectural register mapping may be used by subsequent read operations until overwritten or redefined. A separate set of physical architectural registers are not needed; instead, architectural identifiers or the like are simply mapped to the physical registers. The PRF renaming style is more efficient since the indexes are simply moved or remapped rather than having to move values between registers.

The processor allocates up to one physical register per instruction issued for execution. Many instructions, such as read instructions and the like, do not store information so that a register need not be allocated. In the normal case, up to one register may be de-allocated or recycled into the free list for each instruction that is retired. A superscalar processor is capable of executing multiple instructions in parallel, and thus should be configured as an N-retired micro-architecture capable of recycling an integer number "N" of physical registers into the free list per processor clock cycle. PRF renaming style introduces size issues for the instructions, in which registers are recycled at a higher rate. As an example, multiple instructions referencing the same architectural register with different sizes are nonetheless allocated different physical registers, so that multiple physical registers implicate the same architectural register. Ultimately, one or more of such physical registers may be merged when a read instruction referencing the same architectural register is issued. Thereafter up to two registers may be recycled upon retirement of an overwritten instruction referencing the same architectural register. An overflow condition exists when more than one physical register is recycled in one processor cycle.

Theoretically, the N-retired micro-architecture needs to be configured to retire up to 2 N registers per processor cycle to meet timing constraints. Otherwise, the processor may be stalled for one or more processor cycles to handle register recycle overflow.

SUMMARY OF THE INVENTION

A processor according to one embodiment of the present invention includes physical registers, a reorder buffer, a master free list, a slave free list, a master recycle circuit, and a slave recycle circuit. Each physical register is identified by a physical register index. The reorder buffer includes multiple instruction entries in which each entry stores up to two physical register indexes for recycling corresponding physical registers. The reorder buffer retires up to N instructions in each processor cycle. The master and slave free lists each include N input ports and each stores corresponding physical register indexes of physical registers. The physical registers whose corresponding physical register indexes are stored in the master free list are for allocating to instructions being issued. The master recycle circuit routes a first physical register index, which is stored in an instruction entry of an instruction, to one of the N input ports of the master free list when the instruction is being retired. The slave recycle circuit routes a second physical register index, which is stored in the instruction entry of an instruction, to one of the N input ports of the slave free list when the instruction is retired.

The processor may include a transfer circuit that, for any given processor cycle in which the master recycle circuit recycles less than N physical registers by a difference number, transfers up to the difference number of physical register indexes stored in the slave free list to available input ports of the master free list. The processor may include an allocator that stores the first physical register index in the instruction entry of the instruction when the instruction upon whose retirement a corresponding first physical register is to be recycled is issued, and that additionally stores the second physical register index in the instruction entry of the instruction when the instruction upon whose retirement a corresponding second physical register is to be recycled is issued. Each instruction entry may store a first valid value for the first physical register index and a second valid value for the second physical register index, in which an allocator sets the first valid value to indicate validity when storing the first physical register index and sets the second valid value to indicate validity when storing the second physical register index.

The master recycle circuit may select and forward valid ones of up to N first physical register indexes from those of the instruction entries that correspond to the up to N instructions being retired onto a corresponding N recycle paths. The processor may further include a select circuit that receives and provides the valid ones of up to N first physical register indexes to corresponding ones of the N input ports of the master free list. The master recycle circuit may assert N select signals indicating which of the N recycle paths provides a corresponding one of the valid ones of up to N first physical indexes. The processor may further include a transfer controller that receives valid ones of the N select signals, determines a difference number based upon a difference between N and an actual number of the valid select signals that indicates a valid value, and retrieves and transfers up to the difference number of physical register indexes stored in the slave free list to the select circuit via N transfer paths. The slave recycle circuit may select and forward valid ones of up to N second physical indexes from those of the instruction entries that correspond to the up to N instructions being retired onto a corresponding N recycle paths coupled to the N input ports of the slave free list.

A method of recycling physical registers in a processor according to one embodiment of the present invention includes retiring, by a reorder buffer, up to N instructions in each processor cycle, and for each instruction being retired, when a first physical register is identified to be recycled upon retirement of the instruction, routing a corresponding first physical register index to a master free list, and when a second physical register is identified to be recycled upon retirement of the instruction, routing a corresponding second physical register index to a slave free list, and allocating physical registers whose corresponding physical register indexes are stored in the master free list to instructions being issued.

The method may include, when less than N first physical registers are recycled in a processor cycle, determining a difference number between N and an actual number of first physical registers being recycled to the master free list, and transferring up to the difference number of physical register indexes stored in the slave free list to the master free list. The method may include, for each instruction being issued for execution, storing the first physical register index in an instruction entry of the reorder buffer when the instruction upon whose retirement the first physical register is to be recycled is issued, and storing the second physical register index in the instruction entry when the instruction upon whose retirement the second physical register is to be recycled is issued. The method may include updating a valid bit for each physical register index stored in the instruction entry. The method may include forwarding each valid first physical index onto a corresponding one of N recycle paths, and selecting from among the N forward paths those carrying a valid first physical index and providing each valid first physical index to an input port of the master free list. The method may include forwarding each valid second physical index to a corresponding one of the N input ports of the slave free list.

BRIEF DESCRIPTION OF THE DRAWINGS

The benefits, features, and advantages of the present invention will become better understood with regard to the following description, and accompanying drawings where.

DETAILED DESCRIPTION

The inventor has recognized timing issues of processors with the PRF renaming style in which physical registers are recycled at a higher rate than normal. He has therefore developed a processor with a configuration free list including a master free list, a slave free list and a recycle circuit. Upon retirement of an instruction that recycles two physical registers, a corresponding first physical register index is routed to the master free list and a corresponding second physical register index is routed to the slave free list. In this manner, the slave free list handles overflow of recycled registers. When the processor retires up to a predetermined number N instructions per processor cycle, up to 2 N physical registers may be recycled in which up to N are recycled to the master free list and up to N are recycled to the slave free list. In another embodiment of the present invention, the processor further comprises a transfer circuit. In any given processor cycle in which less than N physical registers are recycled to the master free list, the transfer circuit may transfer up to a difference number of physical register indexes from the slave free list to the master free list, in which the difference number is the difference between N and the actual number of the physical registers recycled to the master free list.

Figure 1:
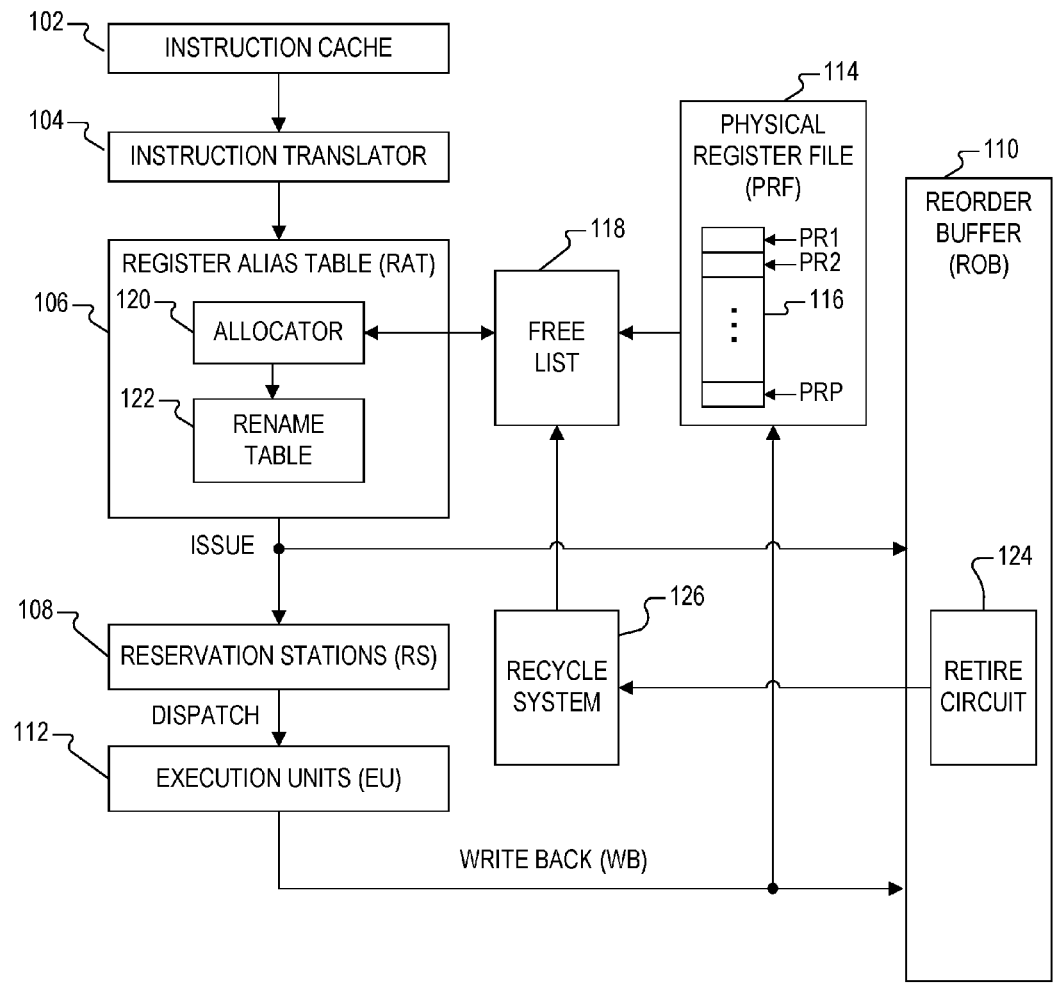
FIG. 1 is a simplified block diagram of a superscalar, pipelined processor including a physical register recycle system implemented according to one embodiment of the present invention.

FIG. 1 is a simplified block diagram of a superscalar, pipelined processor 100 including a physical register recycle system implemented according to one embodiment of the present invention. The term "processor" as used herein refers to any type of processing unit, including a microprocessor, a central processing unit (CPU), a processing core, a microcontroller, etc. The term "processor" as used herein also includes any type of processor configuration, such as processing units integrated on a chip or integrated circuit (IC) including those incorporated within a system of a chip (SOC) or the like.

The processor 100 includes an instruction cache 102 that caches macroinstructions of an instruction set architecture (ISA), such as the x86 instruction set architecture or the like. Additional or alternative instruction set architectures are contemplated. The processor 100 includes an instruction translator 104 that receives and translates the macroinstructions into microinstructions. The microinstructions are then provided to a register alias table (RAT) 106, which generates microinstruction dependencies and issues the microinstructions in program order to reservations stations (RS) 108 and to a reorder buffer (ROB) 110. The processor 100 may be an "N" issue core in which it issued up to N microinstructions per processor cycle, in which N it a positive integer. The ROB 110 stores an entry for every instruction issued from the RAT 106 and ensures in-order retirement of instructions. The microinstructions issued from the RAT 106 may typically be referred to as microinstructions, but are more generally referred to herein simply as "instructions."

The RS 108, otherwise referred to as a dispatcher, dispatches the instructions to an appropriate one of multiple execution units 112. In one embodiment, the processor 100 is an out-of-order (OOO) processor in which the RS 108 may dispatch instructions to the execution units 112 when ready rather than strictly in program order. Although not specifically shown, the execution units 112 may include one or more integer execution units, such as an integer arithmetic/logic unit (ALU) or the like, one or more floating point execution units, such as including a single-instruction-multiple-data (SIMD) execution unit such as MMX and SSE units or the like, a memory order buffer (MOB), etc. Any result of a write instruction is written to an allocated one of multiple physical registers 116 within a physical register file (PRF) 114 via a write back (WB) path. The entry of the ROB 110 corresponding to the write instruction stores an index to the physical register for writing the results. The PRF 114 includes an integer number "P" of the physical registers 116, each identified, pointed to, or otherwise referenced or addressed by a corresponding one of multiple physical register indexes PR1, PR2, PRP (PR1-PRP). A free list 118 is provided to store a list of physical register indexes to identify those physical registers that are free and available for allocating to instructions issued by the RAT 106.

The RAT 106 includes an allocator 120 and a rename table 122. The rename table 122 cross-references or maps architectural registers to the physical registers of the PRF 114. When a write operation references an architectural register for storing results, the allocator 120 consults the free list 118 and selects and allocates a physical register. The allocator 120 then stores the index of the allocated physical register into an entry of the rename table 122 corresponding to the architectural register referenced in the write instruction. In this manner, the physical register is initially mapped to both the architectural register and the write instruction. As further described herein, a different physical register is allocated for each new write instruction even when a subsequent write instruction references the same architectural register. In this manner, an architectural register may be mapped to multiple physical registers at any given time.

The ISA for the processor 100, such as x86 in the illustrated configuration, uses complex operand sizes allowing partial writes to each architectural register. The x86 architecture includes several architectural registers that may be accessed with multiple sizes. The 64-bit versions include register notations RAX, RBX, RCX, RDX, etc., (64-bit uses pre-pended 'It' notations) in which a write operation using any of these 64-bit notations is a write to the entire register. These registers include 32-bit notations EAX, EBX, ECX, EDX, etc., respectively, (32-bit uses pre-pended 'E' notations) as well as 16-bit notations AX, BX, CX, DX, etc., respectively (16-bit uses only register name without a pre-pended letter). 8-bit notations may also be defined, but each is typically to the most significant byte (MSB) or the least significant byte (LSB) of the 16-bit version. The rename table 122 may include corresponding architectural identifiers for any given register or portions thereof mapped to one or more physical registers.

Assuming that the processor 100 includes an "N-retire" core in which the ROB 110 may retire up to N instructions in any given processor cycle, and that each of the N instructions may recycle up to 2 physical registers, then the ROB 110 may recycle up to 2 N physical registers during any given processor cycle. As an example, consider the following instruction pattern:

$\mu op1$) ADD EAX, $imm32$
$\mu op2$) ADD AX, $imm16$
... ...
$\mu op3$) ADD EAX, $imm32$ in which each instruction is illustrated as a microinstruction or micro-op ($\mu op$). A first physical register is allocated for the first ADD instruction ($\mu op1$) and the allocated physical register is mapped to the EAX architectural register. As an example, suppose the first physical register is identified by the index PR1. For simplicity, the first physical register may be referred to as "PR1." The first ADD instruction $\mu op1$ instructs the processor 100 to add a 32-bit immediate value "imm32" provided within the instruction to the existing contents of the 32-bit register EAX. A second physical register, say PR2, is allocated for the second ADD instruction ($\mu op2$) and mapped to the AX architectural register. The second ADD instruction $\mu op2$ instructs the processor 100 to add a 16-bit immediate value "imm16" provided within the instruction to the existing contents of the 16-bit register AX. It is noted, however, that architectural register AX is the least significant portion (lower half) of the EAX architectural register, so that effectively a portion of the contents of the EAX register are intended to be modified by $\mu op2$. Neither of the first and second physical registers holds the complete contents of the EAX architectural register; instead, a portion is stored in each. A third physical register, say PR3, is allocated for the third ADD instruction ($\mu op3$) and mapped to the same architectural register EAX. The third ADD instruction is the same as the first in which another (or the same) immediate value "imm32" provided within the instruction is added to the existing contents of the 32-bit register EAX.

Two physical registers, PR1 and PR2, are allocated for the first two instructions $\mu op1$ and $\mu op2$, respectively to hold their respective results. In response to the third instruction $\mu op3$, the results of the first two instructions are overwritten by the content of the third register PR3. Upon retirement of the third instruction $\mu op3$, the first two registers PR1 and PR2 may be recycled. Thus, if N instructions are retired in any given processor cycle, in which each instruction (e.g., an instruction like the third ADD instruction $\mu op3$) may recycle up to 2 registers, then the ROB 110 may recycle up to 2 N physical registers during the retire phase of the N instructions.

The ROB 110 includes a retire circuit 124 that is configured to retire up to N instructions per processor cycle including recycling physical registers back to the free list 118. It is noted that in many processor cycles, less than N instructions may be retired including the case in which no instructions are retired. As noted above, the retire circuit 124 may recycle up to 2 N physical registers for the case in which N instructions are retired with each recycling 2 physical registers. It is noted that in many processor cycles, less than 2 N physical registers are recycled even including the case in which no physical registers are recycled. Nonetheless, the processor 100 handles the worst case condition in which more than N and up to 2 N physical registers are retired to relieve retire timing pressure. As described further herein, a recycle system 126 is included and the free list 118 is configured to collectively ensure recycling bandwidth for the worst case conditions to avoid timing issues and maintain processor performance. The retire circuit 124 forwards physical register indexes of physical registers being retired to the recycle system 126, which then transfers the physical register indexes of physical registers to the free list 118 when the corresponding physical registers are recycled as further described herein.

Figure 2:
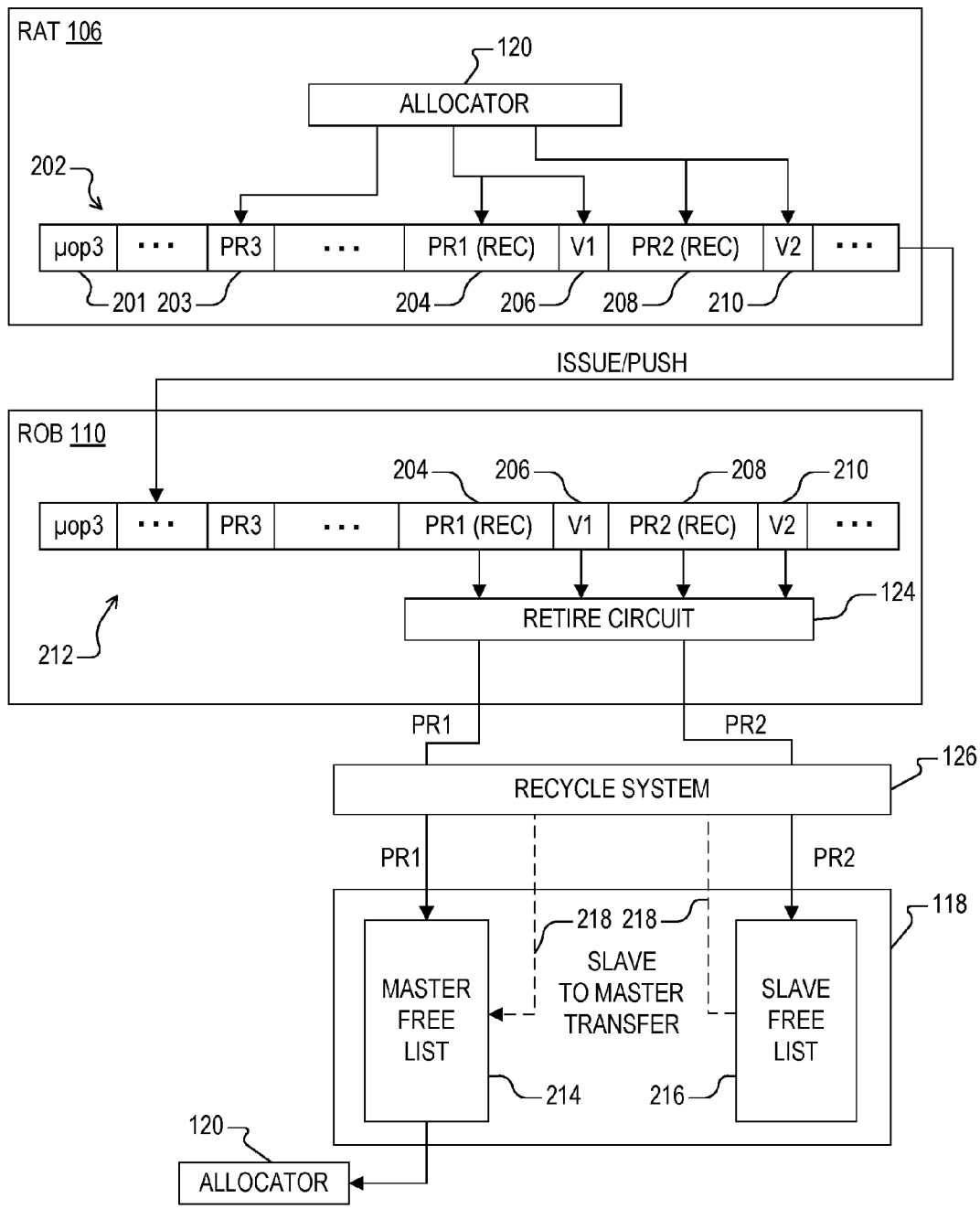
FIG. 2 is a simplified block diagram illustrating physical register allocation by the RAT of FIG. 1, entry of instructions (instruction entries) into the ROB of FIG. 1, and recycling of physical register indexes into the free list according to one embodiment of the present invention.

FIG. 2 is a simplified block diagram illustrating physical register allocation by the RAT 106, entry of instructions (instruction entries) into the ROB 110, and recycling of physical register indexes into the free list 118 according to one embodiment of the present invention. The RAT 106 formulates an instruction entry 202 for each received instruction, and each instruction entry 202 includes fields for storing information carried along with the instruction for execution and retirement. The instruction entry 202 includes a first field 201 that identifies the instruction and/or instruction type. The instruction entry 202 includes a field 203 for storing a physical register index that identifies a corresponding physical register 116 within the PRF 114 used to store information for the instruction owning the instruction entry 202 if the instruction is a write instruction or any other instruction that stores information. The field 203 is included even for those instructions in which a physical register is not allocated. The instruction entry 202 includes another field 204 for storing a first physical register index that identifies a corresponding first one of the physical registers 116 that is to be recycled upon retirement of the instruction. The instruction entry 202 includes yet another field 208 for storing a second physical register index that identifies a corresponding second one of the physical registers 116 that is also to be recycled upon retirement of the instruction.

The allocator 120 only stores valid physical register indexes into the fields 204 and/or 208 when the instruction upon whose retirement the first and/or second physical register is to be recycled is issued by the RAT 106, for example, when the third ADD instruction μop3 is issued by the RAT 106. In many or even most cases, 0 or 1 physical registers are recycled upon the retirement of one instruction. A valid field 206 is provided associated with the field 204 to indicate whether the field 204 stores a valid entry, and another valid field 210 is associated with the field 208 to indicate whether the field 208 stores a valid entry. A valid entry means the corresponding first/second physical register will be recycled upon the retirement of the instruction owning the instruction entry 202. Additional fields and values may be included but are not shown or further described. Each of the fields are shown with names or corresponding mnemonics or the like to convey the information stored, in which the actual information is a binary or digital number or the like. The RAT 106 may include other logic (not shown) responsible for defining or filling other fields that are not shown. The allocator 120 is responsible for filling the fields associated with allocation and recycling of the physical registers 116.

It is appreciated that many of the fields of an instruction entry 202 in the RAT 106 may be left blank or otherwise undefined. For example, field 203 may be left blank or undefined for read type instructions that do not require a physical register to write results, although a separate physical register (not shown) may be defined for storing data read from a system memory or the like (not shown). In the case in which no physical registers are recycled upon retirement of the instruction, then both fields 204 and 208 may be left blank or undefined and the fields 206 and 210 are marked with an "invalid" value indicating that the fields 204 and 208, respectively, are invalid. In one embodiment, the fields 206 and 210 are one-bit values in which a logic "0" indicates invalidity and a logic "1" indicates validity of the corresponding physical register field. In many instruction cases, there are no physical registers to be recycled. In many other write type instructions, only one physical register is recycled so that the field 204 holds a corresponding physical register index, the field 206 is marked as valid, the field 208 is not defined and the field 210 is updated to reflect that the field 208 is invalid. Generally, the vast majority of instructions recycle 0 or 1 physical register(s) upon retirement, and only a few instructions recycle two physical registers upon retirement.

The illustrated instruction entry 202 generally represents the third ADD instruction μop3 referred to previously. In this case, the allocator 120 allocates the physical register PR3 for storage of write results, so that PR3 is stored in field 203. The allocator 120 is configured to identify any of the physical registers 116 that are to be recycled upon retirement of the instruction. recycled upon retirement of μop3. Thus, the allocator 120 stores the physical register For the instruction μop3, the physical registers PR1 and PR2 assigned to the instructions μop1 and μop2, respectively, are to be index PR1 into the field 204 (shown as PR1 (REC) indicating that it is to be recycled) and the field 206 is marked with a valid value V1 indicating that the field 204 holds a valid value. Also, the allocator 120 stores the physical register index PR2 into the field 208 (shown as PR2 (REC)) and the field 210 is marked with a valid value V2 indicating that the field 208 holds a valid value.

As previously described, when an instruction is ready for execution, the RAT 106 issues the instruction to the RS 108 and to the ROB 110. As shown in FIG. 2, the instruction entry 202 in the RAT 106 is pushed as a corresponding entry 212 into the ROB 110. The instructions entries 202 and 212 are shown having similar formats, which may or may not be the case for a given configuration. Nonetheless, the instruction entry 212 pushed into the ROB 110 includes the fields 204, 206, 208 and 210 (or similar fields with the same information) for the instruction μop3. When the instruction μop3 is ready to be retired, the retire circuit 124 selects the instruction μop3 and the fields 204, 206, 208 and 210 are output from the ROB 110 to the recycle system 126.

The free list 118 is configured with two different free lists, shown as a master free list 214 and a slave free list 216, which store never-used or recycled physical register indexes. The recycle system 126 forwards the first physical register index PR1 to the master free list 214 and forwards the second physical register index PR2 to the slave free list 216. The allocator 120 allocates free and available physical registers only from the master free list 214 for instructions being issued from RAT 106 and does not allocate from the slave free list 216. As previously described, the retire circuit 124 recycles up to N instructions in any given processor cycle, so that up to N physical register indexes may be recycled to the master free list 214 and up to N physical register indexes may be recycled to the slave free list 216. As described more fully herein, the master and slave free lists 214 and 216 each include N input ports to receive up to N physical register indexes at a time. In most processor cycles, however, less than 2 N physical registers are recycled. In most practicable configurations, the recycling of 2 N physical registers rarely occurs, so that the master free list 214 generally fills faster than the slave free list 216. The master free list 214 is emptied for new allocations; new allocations are not provided by the slave free list 216. The slave free list 216 is emptied by transferring overflow indexes to the master free list 214 as further described herein.

A transfer path 218 is shown from the slave free list 216 to the master free list 214 through the recycle system 126 to transfer physical register indexes stored in the slave free list 216 to the master free list 214. The transfer of physical register indexes from the slave free list 216 to the master free list 214 may occur when less than N physical indexes are recycled to the master free list 214 in any given processor cycle. When less than N physical indexes are recycled to the master free list 214 in a processor cycle, if there are physical indexes stored in the slave free list 216, then the unused or available ports to the master free list 214 may be filled by physical register indexes from the slave free list 216 via the transfer path 218 as further described herein. In one embodiment, this is true even during a processor cycle in which one or more physical register indexes are being recycled to the slave free list 216 in the same processor cycle. In this manner, in any given processor cycle in which two physical registers are being recycled for one or more instructions being retired, the second physical register index of each retired instruction is stored in the slave free list 216. Furthermore, in any given processor cycle, a difference number (D) is determined by subtracting from N an actual number (A) of physical registers being recycled to the master free list 214, or D=N−A. In any given processor cycle, up to D physical register indexes may be transferred from the slave free list 216 to the master free list 214.

Figure 3:
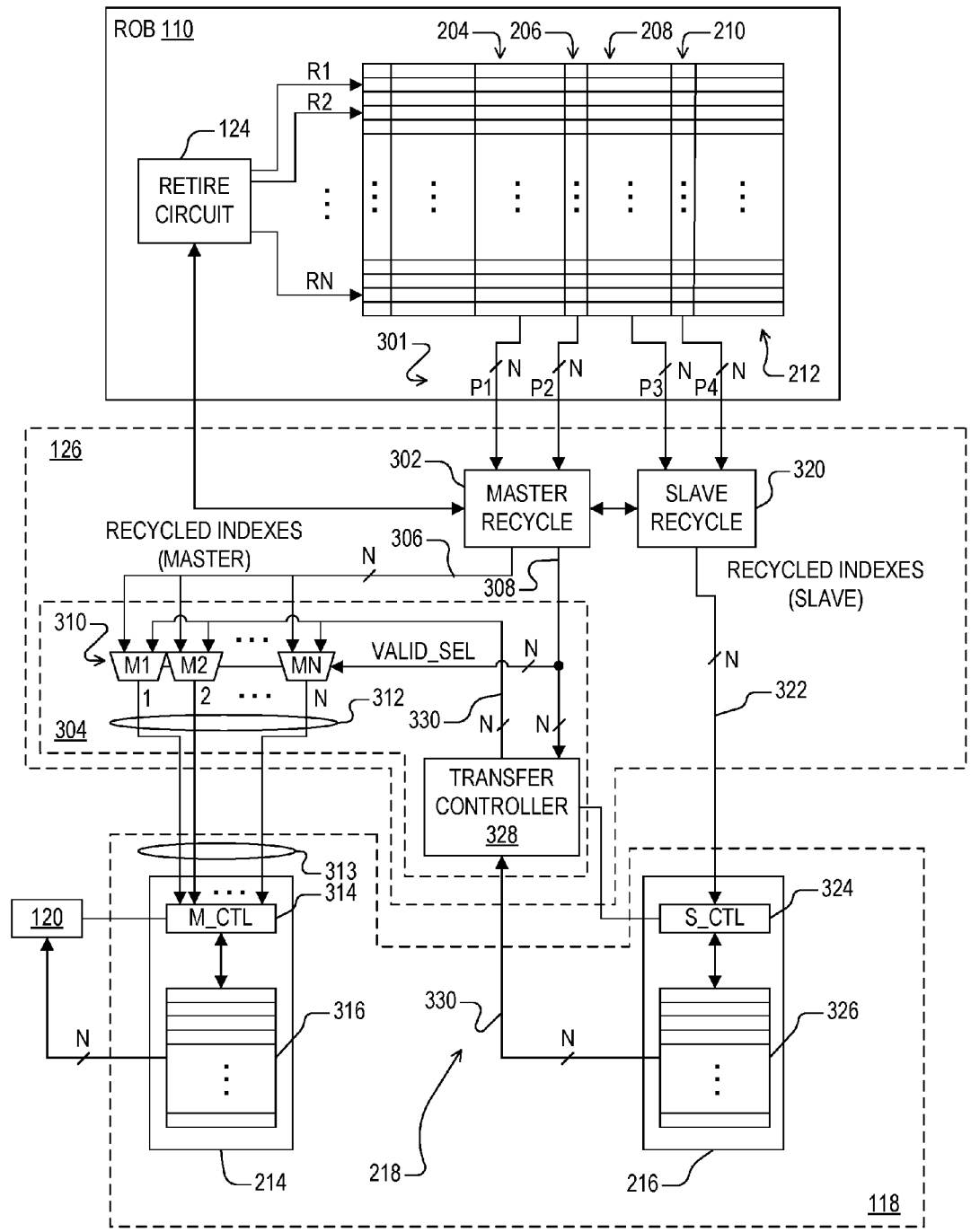
FIG. 3 is a more detailed block diagram of the recycle system of FIG. 1 according to one embodiment of the present invention provided between the ROB and the free list for recycling physical registers, along with additional details of the free list and the ROB according to one embodiment.

FIG. 3 is a more detailed block diagram of the recycle system 126 according to one embodiment of the present invention provided between the ROB 110 and the free list 118 for recycling physical registers 116, along with additional details of the free list 118 and the ROB 110 according to one embodiment. The ROB 110 is shown including multiple instruction entries 212, each configured the same as the instruction entry 212 shown in FIG. 2. Each instruction entry 212 includes the fields 204, 206, 208 and 210 for storing physical register indexes and corresponding validity values for any physical registers to be recycled for each corresponding instruction. The retire circuit 124 performs retirement cycles in which it selects N entries in each processor cycle from among the multiple instruction entries 212 corresponding with instructions that are ready for retirement. The selected entries are shown being accessed by arrows labeled R1, R2, . . . , RN. The ROB 110 includes a set of output ports 301 for the fields 204, 206, 208 and 210, in which each output port 301 outputs up to N indexes or up to N corresponding valid values on each output port 301 for each instruction entry selected for retirement. In particular, up to N first physical register indexes from selected fields 204 are output on a first port P1, up to N corresponding valid values from selected fields 206 are output on a second port P2, up to N second physical register indexes from selected fields 208 are output on a third port P3, and up to N corresponding valid values from selected fields 210 are output on a fourth port P4.

The recycle system 126 includes a master recycle circuit 302, a slave recycle circuit 320, and a transfer circuit 304. The physical register indexes and corresponding valid values from selected fields 204 and 206 from the output ports P1 and P2, respectively, of the ROB 110 are provided to corresponding inputs of the master recycle circuit 302, which may communicate with the retire circuit 124 for timing purposes. The master recycle circuit 302 evaluates each of the N valid values received from port P2 to determine which, if any, of the N first physical register indexes received from port P1 are valid. Any valid ones of the N first physical register indexes are forwarded along corresponding ones of N master recycle paths 306 to a corresponding one of N inputs of a select circuit 310 of the transfer circuit 304. The master recycle circuit 302 further outputs N VALID-_SEL signals along corresponding signal paths 308 provided to control inputs of the select circuit 310 for identifying and selecting valid first physical register indexes received from the master recycle circuit 304 via the master recycle paths 306.

In the illustrated configuration, the select circuit 310 is configured as N 2-input multiplexers (MUXes) M1, M2, . . . , MN (M1-MN), in which each master recycle path 306 is provided to a first input of a corresponding one of the MUXes M1-MN. Each of a set of N transfer paths 330 (i.e., transfer path 218 in FIG. 2) is provided to a second input of a corresponding one of the N MUXes of the select circuit 310. Alternative implementations of the select circuit 310 are contemplated. As shown, each VALID_SEL signal may be provided to a control input of a corresponding one of the N MUXes. When a master recycle path 306 is not selected, then a corresponding one of the transfer paths 330 is selected instead. The select circuit 310 outputs up to N valid physical register indexes on N output ports 312 to N input ports 313 of the master free list 214.

The master free list 214 is shown including a master control circuit (M_CTL) 314 for receiving and enqueuing received physical register indexes via the input ports 313 into a corresponding master queue 316. The master queue 316 may be implemented in any suitable manner for storing a free list of physical register indexes, such as, for example, a first-in, first-out (FIFO) queue or the like, a stack configuration, a circular buffer, etc. The master queue 316 may be configured with any suitable size to store any suitable number of physical register indexes. In one embodiment, the master queue 316 stores up to the integer number P of physical register indexes to match the size of the PRF 116. The master control circuit 314 is configured to input and output physical register indexes into and out of the master queue 316. For example, the allocator 120 interfaces the master control circuit 314 for allocating up to M physical registers for new instructions to be issued (for an M-issue core). In most cases, the M equals to N, that is the issue ratio of RAT 106 is equal to the retire ratio of the ROB 110. The present invention, however, is not limited to the case in which M equals N.

The physical register indexes and corresponding valid values from selected fields 208 and 210 from the output ports P3 and P4, respectively, of the ROB 110 are provided to corresponding inputs of the slave recycle circuit 320, which may communicate with the retire circuit 124 for timing purposes. The slave recycle circuit 320 evaluates each of the N valid values received from port P4 to determine which, if any, of the N second physical register indexes received from port P3 are valid. Any valid ones of the N second physical register indexes are routed along corresponding ones of N slave recycle paths 322 to a corresponding one of N inputs of the slave free list 216.

The slave free list 216 is configured in a similar manner as the master free list 214 including a slave control circuit (S_CTL) 324 for receiving and enqueuing received second physical register indexes via the slave recycle paths 322 into a corresponding slave queue 326. The slave queue 326 may be may be implemented in any suitable manner for storing a free list of physical register indexes, such as, for example, a first-in, first-out (FIFO) queue or the like, a stack configuration, a circular buffer, etc., similar to the master queue 316.

The size of the slave queue 326 may be the same as the master queue 316. It is noted, however, that the slave queue 326 may be reduced in size since it is only necessary to include the overflow (or second) physical register indexes. For example, in the worst case when 2 N physical registers are recycled per processor cycle, then only half of the register indexes are provided to the slave queue 326 so that it may be half the size of the master queue 316 if the combined total is at least the total number of the physical registers 116. Thus, if the master queue 316 has a size to include up to P entries, then the slave queue 326 need only include up to P/2 entries, although the present invention is not limited to this configuration. The slave control circuit 324 is configured similar to the master control circuit 314 to input and output physical register indexes into and out of the slave queue 326.

The allocator 120 does not allocate from the slave free list 216. Instead, the transfer circuit 304 includes a transfer controller 328 that receives the N VALID_SEL signals from the master recycle circuit 302 to identify which of the N master recycle paths 306 include valid first physical register indexes and which do not. If the N VALID_SEL signals indicate that each of the N master recycle paths 306 is carrying a valid physical register index, then the transfer controller 328 does not transfer any physical register indexes stored in the slave queue 326. In the event, however, that one or more and up to N of the master recycle paths 306 is empty or otherwise is available to receive data, then the transfer controller 328 determines the difference number D of available recycle paths, and communicates with the slave control circuit 324 to access up to D physical register indexes stored in the slave queue 326. The physical register indexes accessed from the slave queue 326 are provided on corresponding ones of the N transfer paths 330 (i.e., transfer path 218 in FIG. 2) and provided to corresponding inputs of the select circuit 310. As previously described, each of the N transfer paths 330 is provided to the second inputs of the N MUXes of the select circuit 310. The VALID_SEL signals are already output from the master recycle circuit 302 to select corresponding ones of the N transfer paths 330 when the corresponding master recycle paths 306 do not carry valid first physical register indexes from the master recycle circuit 302.

It is appreciated that there may be many processor cycles in which at least one recycle and/or transfer path does not include a valid physical register index. For example, although it is possible that each of the output ports P3 of the ROB 110 includes a valid second physical register index, in most processor cycles at least one and even up to all of the outputs from the output port P3 of the ROB 110 are invalid. In one embodiment, the slave recycle circuit 320 communicates with the slave control circuit 324 to identify which of the slave recycle paths 322 include a valid physical register index and which do not. In this case, the slave control circuit 324 simply ignores any of the save recycle paths 322 that do not carry a valid physical register index. In an alternative embodiment, the slave recycle circuit 320 is configured to insert "dummy," invalid or otherwise "null" values onto the slave recycle paths 322 that do not carry a valid physical register index, and the slave control circuit 324 is configured to ignore such invalid or dummy values.

Likewise, when less than N of the master recycle paths 306 includes valid physical register indexes, and the slave queue 326 does not include a sufficient number of stored physical register indexes, then the transfer controller 328 transfers less than the difference number D of valid physical register indexes to the master free list 214. In that case, at least one and up to all of the N output ports 312 does not provide a valid physical register index to the master free list 214. In one embodiment, the transfer controller 328 communicates with the master control circuit 314 to identify which of the N inputs 313 include a valid physical register index and which do not, so that the master control circuit 314 simply ignores any of its N inputs 313 that do not carry a valid physical register index. In an alternative embodiment, the transfer controller 328 is configured to insert "dummy," invalid or otherwise "null" values onto the transfer paths 330 that are selected but which do not provide a physical register index from the slave queue 326, and the master control circuit 324 is configured to ignore such invalid or dummy values.

In this manner, it is appreciated that the slave free list 216 receives any overflow physical register indexes when one or more of the instructions being retired in any given processor cycle includes a second physical register index identifying a corresponding physical register to be recycled. Each of the second physical register indexes are considered overflow indexes. In any of the processor cycles in which the less than N first physical registers are being recycled to the master free list 214, the transfer circuit 304 fills the balance from any of the overflow indexes stored in the slave free list 216. The transfer controller 328, for example, determines the difference D between N and the actual number being recycled from the ROB 110 to the master free list 214, and transfers up to D physical register indexes from the slave free list 216 to the master free list 214. The slave free list 216 therefore enables overflow indexes to be recycled quickly to relieve retire timing pressure, while being transferred for ultimate re-allocation. The transfer controller 328 and the slave free list 216 cooperate with the master recycle circuit 302 to ensure recycling bandwidth under worst case conditions so that ultimately all recycled physical register indexes are forwarded or transferred to the master queue 316 for subsequent allocation.

The number "N" is selected according to the capabilities of a particular implementation and may be different for different configurations. In one non-limiting embodiment, for example, M=4 and N=4 so that up to 4 instructions are issued and/or retired per processor cycle and up to 8 physical registers may be recycled per processor cycle. It is appreciated that M and N may each be any other suitable number.

Figure 4:
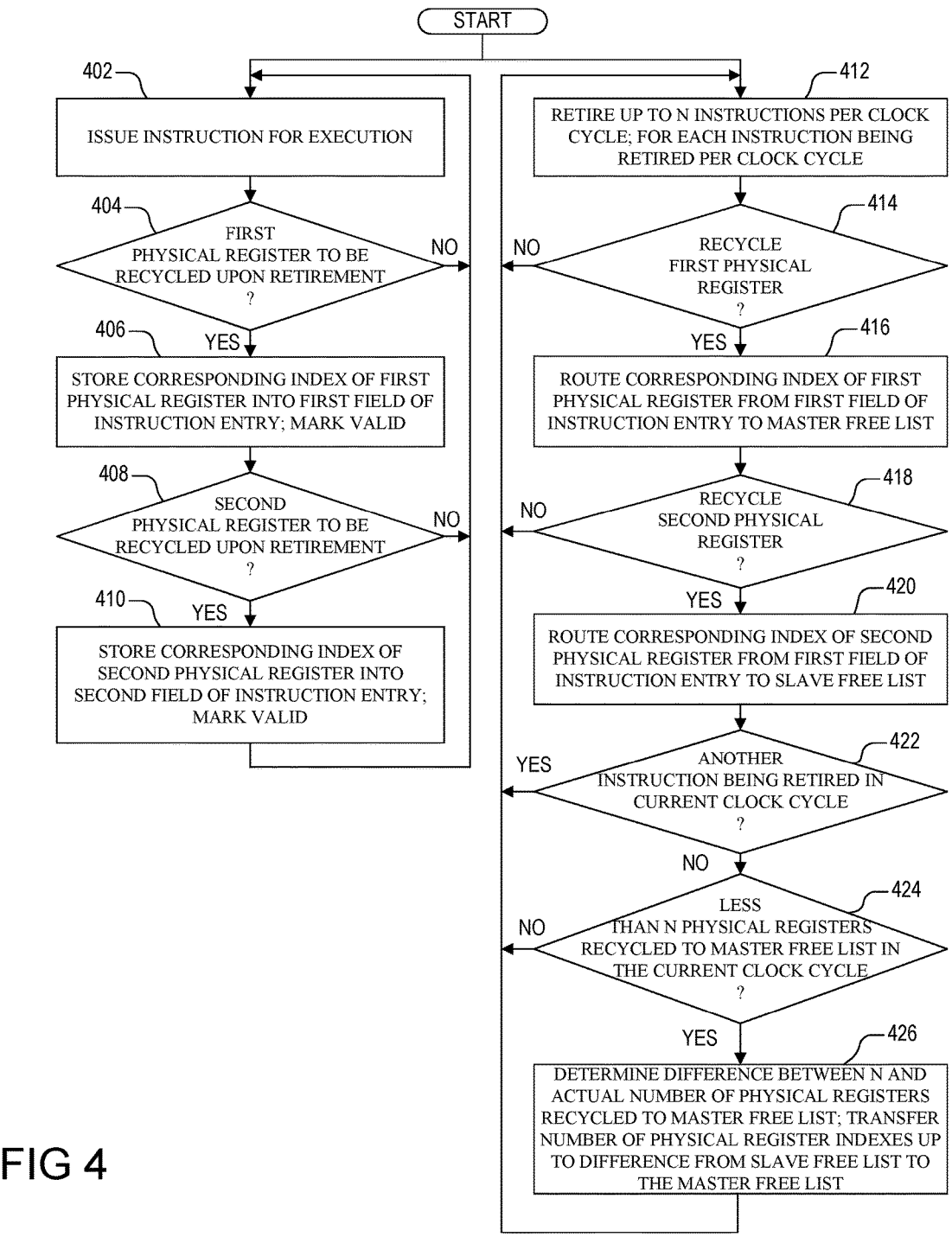
FIG. 4 is a flowchart diagram illustrating a method of recycling physical registers in a processor according to one embodiment of the present invention, such as performed by the processor of FIG. 1.

FIG. 4 is a flowchart diagram illustrating a method of recycling physical registers in a processor according to one embodiment of the present invention, such as performed by the processor 100. As previously described, the RAT 106 issued up to N instructions at a time per clock cycle for execution. A first block 402 indicates the process for each instruction being issued for execution. At next block 404, if there are no physical registers to be recycled upon retirement of the instruction, then operation returns to block 402. If, however, it is determined that a first physical register is to be recycled upon retirement of the instruction, then operation proceeds to next block 406 in which the corresponding physical register index of the first physical register is stored into a first field of the instruction entry. As previously shown for the instruction entry 202, the field 204 is provided for storing the first physical register index that identifies the first one of the physical registers 116 that is to be recycled upon retirement of the instruction. The first entry is marked as valid (e.g., by setting valid field 206). At next block 408, if a second physical register is not to be recycled upon retirement of the instruction, then operation returns to block 402. If, however, it is determined that a second physical register is also to be recycled upon retirement of the instruction, then operation proceeds to next block 410 in which the corresponding physical register index of the second physical register is stored into a second field of the instruction entry. As previously shown for the instruction entry 202, the field 208 is provided for storing the second physical register index that identifies the second one of the physical registers 116 that is to be recycled upon retirement of the instruction. The second entry is marked as valid (e.g., by setting valid field 210). Operation loops between the blocks 402-410 for each instruction issued for execution.

Meanwhile, the ROB 110 may retire up to N instructions in any given processor cycle as indicated by block 412. For each instruction being retired per clock cycle, operation proceeds to block 414 to determine whether a first physical register is to be recycled upon retirement of the instruction indicated within the instruction entry. If not, then operation loops back to block 412 for the next instruction being retired. If a first physical register is to be recycled as determined at block 414, then operation proceeds to block 416 in which the corresponding physical register index of the first physical register from the first field of the instruction entry are routed to the master free list 214. Operation then proceeds to block 418 to determine whether a second physical register is to be recycled upon retirement of the instruction indicated within the instruction entry. If not, then operation loops back to block 412 for the next instruction being retired. If a second physical register is to be recycled as determined at block 418, then operation proceeds to block 420 in which the corresponding physical register index of the second physical register from the second field of the instruction entry are routed to the slave free list 216. Operation then proceeds to block 422 to determine whether another instruction is being retired in the current clock cycle. If so, operation loops back to block 412 to begin the recycle process again for the next instruction being retired in the current clock cycle.

When there are no more instructions being retired in the current clock cycle as determined at block 422, then operation proceeds to block 424 to determine whether there were less than N physical registers recycled to the master free list 214. If not, then operation proceeds to block 412 to begin the process for the next clock cycle. If, however, there were less then N physical registers recycled to the master free list 214 in the current clock cycle as determined at block 424, then operation proceeds to block 426 in which the difference between N and the actual number of physical registers that were retired to the master free list 214 is determined, and then a number of physical register indexes up to the difference are transferred from the slave free list 216 to the master free list 214. Operation then returns to block 412 for the next clock cycle.

The foregoing description has been presented to enable one of ordinary skill in the art to make and use the present invention as provided within the context of a particular application and its requirements. Although the present invention has been described in considerable detail with reference to certain preferred versions thereof, other versions and variations are possible and contemplated. Various modifications to the preferred embodiments will be apparent to one skilled in the art, and the general principles defined herein may be applied to other embodiments. For example, the circuits described herein may be implemented in any suitable manner including logic devices or circuitry or the like.

Those skilled in the art should appreciate that they can readily use the disclosed conception and specific embodiments as a basis for designing or modifying other structures for carrying out the same purposes of the present invention without departing from the spirit and scope of the invention. Therefore, the present invention is not intended to be limited to the particular embodiments shown and described herein, but is to be accorded the widest scope consistent with the principles and novel features herein disclosed.

What is claimed is:

1. A processor, comprising:
   a plurality of physical registers, each identified by a physical register index;
   a reorder buffer comprising a plurality of instruction entries each storing up to two physical register indexes for recycling corresponding physical registers, wherein said reorder buffer retires up to N instructions in each processor cycle in which N is a positive integer;
   a master free list and a slave free list, each comprising N input ports and storing corresponding physical register indexes of said physical registers, wherein said physical registers whose corresponding physical register indexes are stored in said master free list are for allocating to instructions being issued;
   a master recycle circuit that routes a first physical register index, which is stored in an instruction entry of an instruction, to one of said N input ports of said master free list when said instruction is retired; and
   a slave recycle circuit that routes a second physical register index, which is stored in said instruction entry of said instruction, to one of said N input ports of said slave free list when said instruction is retired;
   wherein the processor further comprises a transfer circuit that, for any given processor cycle in which said master recycle circuit routes less than N physical register indexes by a difference number, transfers up to said difference number of physical register indexes stored in said slave free list to available input ports of said master free list.

2. The processor of claim 1, further comprising an allocator that stores said first physical register index in said instruction entry of said instruction when said instruction upon whose retirement a corresponding first physical register is to be recycled is issued, and that additionally stores said second physical register index in said instruction entry of said instruction when said instruction upon whose retirement a corresponding second physical register is to be recycled is issued.

3. The processor of claim 1, wherein each of said plurality of instruction entries stores a first valid value for said first physical register index and a second valid value for said second physical register index, and wherein an allocator sets said first valid value to indicate validity when storing said first physical register index and sets said second valid value to indicate validity when storing said second physical register index.

4. The processor of claim 1, wherein:
   said master recycle circuit selects and forwards valid ones of up to N first physical register indexes from those of said plurality of instruction entries that correspond to said up to N instructions being retired onto a corresponding N recycle paths; and
   wherein said processor further comprises a select circuit that receives and provides said valid ones of up to N first physical register indexes to corresponding ones of said N input ports of said master free list.

5. The processor of claim 4, wherein:
said master recycle circuit asserts N select signals indicating which of said N recycle paths provides a corresponding one of said valid ones of up to N first physical indexes; and
wherein said processor further comprises a transfer controller that receives valid ones of said N select signals, determines a difference number based upon a difference between N and an actual number of said valid select signals that indicates a valid value, and retrieves and transfers up to said difference number of physical register indexes stored in said slave free list to said select circuit via N transfer paths.

6. The processor of claim 5, wherein said select circuit comprises N 2-input multiplexers each having a first data input coupled to a corresponding one of said N recycle paths from said master recycle circuit, having a second data input coupled to a corresponding one of said N transfer paths, and having a select input coupled to a corresponding one of said N valid select signals.

7. The processor of claim 1, wherein said slave recycle circuit selects and forwards valid ones of up to N second physical indexes from those of said plurality of instruction entries that correspond to said up to N instructions being retired onto a corresponding N recycle paths coupled to said N input ports of said slave free list.

8. A processor, comprising:
a plurality of physical registers, each identified by a physical register index;
a reorder buffer comprising a plurality of instruction entries each storing up to two physical register indexes for recycling corresponding physical registers, wherein each of said plurality of instruction entries corresponds with an instruction that is retired by said reorder buffer;
a master queue and a slave queue, each comprising a plurality of input ports;
a master recycle circuit that routes a first physical register index, which is stored in an instruction entry of an instruction, to said master queue when said instruction is retired;
a slave recycle circuit that routes a second physical register index, which is stored in said instruction entry of said instruction, to said slave queue when said instruction is retired; and
a transfer controller that transfers at least one physical register index stored in said slave queue to said master queue in a processor cycle when said master queue has at least one available input port;
wherein said reorder buffer retires up to a specified number of instructions per processor cycle, and wherein said master recycle circuit routes up to an actual number of first physical register indexes to said master queue from instruction entries that correspond with said instructions being retired;
wherein said transfer controller determines a difference number between said specified number and said actual number of said first physical register indexes routed to said master queue, and wherein said transfer controller transfers up to said difference number of physical register indexes stored in said slave queue to said master queue.

9. The processor of claim 8, further comprising:
an allocator that stores said first physical register index in said instruction entry of said instruction when said instruction upon whose retirement a corresponding first physical register is to be recycled is issued and that marks said first physical register index as valid, and that additionally stores said second physical register index in said instruction entry of said instruction when said instruction upon whose retirement a corresponding second physical register is to be recycled is issued and that marks said second physical register index as valid.

10. The processor of claim 9, wherein said master recycle circuit routes said first physical register index to said master queue only when said first physical register index is marked valid, and wherein said slave recycle circuit routes said second physical register index to said slave queue only when said second physical register index is marked valid.

11. The processor of claim 8, wherein said physical registers whose corresponding physical register indexes are stored in said master free list are for allocating to instructions being issued.

12. A method of recycling physical registers in a processor, comprising:
retiring, by a reorder buffer, up to N instructions in each processor cycle;
for each instruction being retired:
when a first physical register is identified to be recycled upon retirement of the instruction, routing a corresponding first physical register index to a master free list; and
when a second physical register is identified to be recycled upon retirement of the instruction, routing a corresponding second physical register index to a slave free list; and
allocating physical registers whose corresponding physical register indexes are stored in the master free list to instructions being issued;
wherein when less than N first physical registers are recycled to said master free list in a processor cycle, the method further comprises:
determining a difference number between N and an actual number of said first physical registers being recycled to said master free list; and
transferring up to the difference number of physical register indexes stored in the slave free list to the master free list.

13. The method of claim 12, for each instruction being issued for execution, further comprising:
storing the first physical register index in an instruction entry of the reorder buffer when the instruction upon whose retirement the first physical register is to be recycled is issued; and
storing the second physical register index in the instruction entry when the instruction upon whose retirement the second physical register is to be recycled is issued.

14. The method of claim 13, further comprising updating a valid bit for each physical register index stored in the instruction entry.

15. The method of claim 12, wherein said routing the corresponding first physical register index to the master free list comprises:
forwarding each valid first physical index onto a corresponding one of N recycle paths; and
selecting from among the N forward paths those carrying a valid first physical index and providing each valid first physical index to an input port of the master free list.

16. The method of claim 12, wherein said routing said corresponding second physical register index to said slave free list comprises forwarding each valid second physical index to a corresponding one of the N input ports of the slave free list.

* * * * *